April 21, 1959
W. OWEN
2,882,652
GLASS GRINDING AND POLISHING APPARATUS
Filed Feb. 24, 1958
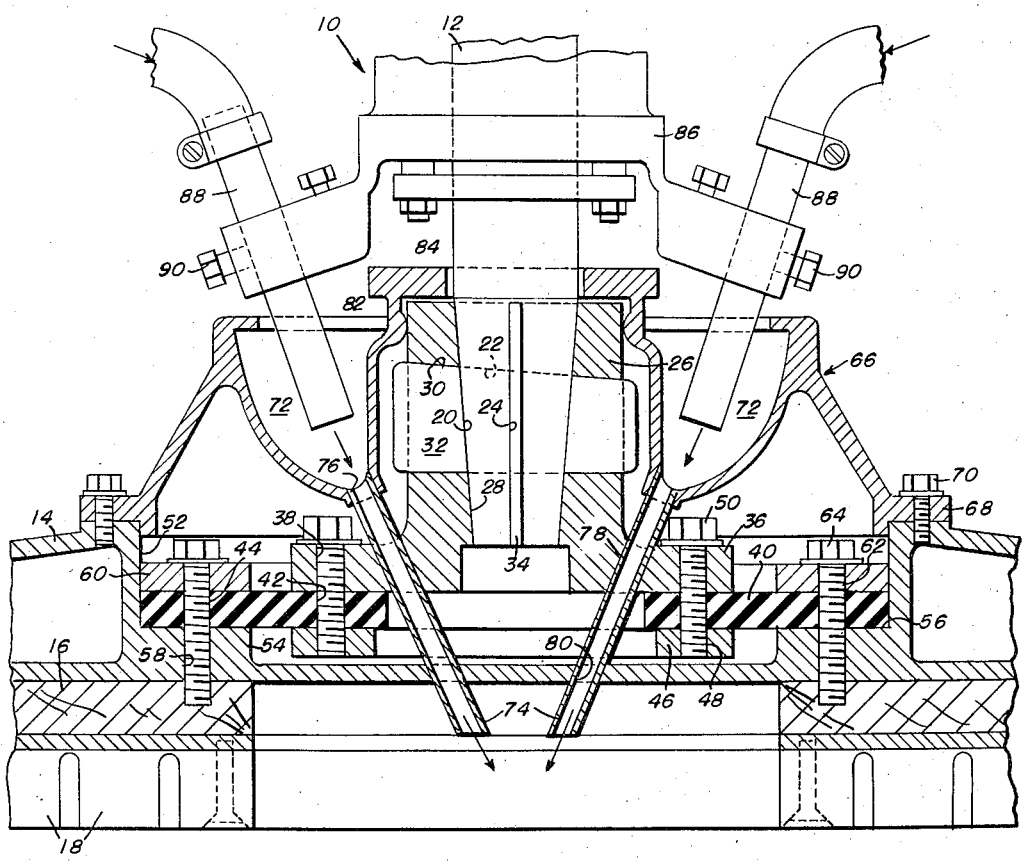
INVENTOR
WILLIAM OWEN
BY
Oscar H. Spencer
ATTORNEY United States Patent Office 2,882,652
Patented Apr. 21, 1959

2,882,652
GLASS GRINDING AND POLISHING APPARATUS

William Owen, Pittsburgh, Pa., assignor to Pittsburgh Plate Glass Company, Allegheny County, Pa., a corporation of Pennsylvania Application February 24, 1958, Serial No. 716,976

4 Claims. (Cl. 51—168)

This invention relates to apparatus for surfacing plate glass and has for its primary object the provision of an improved glass surfacing apparatus having a relatively flexible and cushioning coupling between a vertical drive spindle and a grinding runner, which coupling allows relative angular misalignment between the spindle and the runner so that the runner may adjust itself to the surface of the glass and minimize runner cuts and breakage in the glass.

Another object of this invention is the provision of an improved apparatus for grinding plate glass having means for feeding grinding media centrally of the surfacing or grinding runner.

These and other objects and features of the invention will become apparent from the following description when taken with the accompanying drawing, in which:

The single figure of the drawing is a partial cross-sectional view of the novel structure of this invention.

Referring to the drawing, the structure of this invention is generally identified with the reference character 10, and comprises a vertical drive spindle 12 suitably connected to a source of power (not shown), and a runner block 14, the runner block having a wood deck 16 bolted thereto and having cast iron runner blocks 18 bolted to the wood deck.

The spindle 12 is tapered, as at 20, adjacent its lower terminal end and is provided with a transverse, tapered slot 22 and a longitudinal keyway 24, and the tapered end 20 is received within a driving hub 26 having a tapered opening 28 complementary to the taper of the spindle. The driving hub 26 is provided with a transverse, tapered slot 30 aligned with the slot 22 and a longitudinal keyway (not illustrated) aligned with the keyway 24. A tapered key 32 passes through the aligned slots 30 and 22 and a key 34 is disposed within the keyway 24 and the not illustrated keyway of the hub 26 to drivingly connect the spindle 12 and the hub 26.

The hub 26 is also provided with a radial flange 36 having a plurality of angularly spaced openings 38 therethrough, the flange 36 being adapted to be connected to a flexible annular diaphragm 40, preferably of rubber and canvas belting. Instead of rubber and canvas belting, the diaphragm could be a spring steel plate. The diaphragm 40 is provided with a plurality of radially and angularly spaced openings 42 and 44, the former being in alignment with the openings 38. An annular connecting ring 46 is employed for connecting the diaphragm to the flange 36 and is provided with threaded openings 48 in alignment with the openings 38 and 42, the threaded openings 48 receiving bolts 50 passing through the openings 38 and 42.

The runner block 14 is provided with a pair of centrally located concentric circular recesses 52 and 54 which define an annular shoulder 56 therebetween, which annular shoulder has threaded openings 58 extending therefrom. The diaphragm 40 is received within the recess 52 and on the shoulder 56 with the openings 44 in alignment with the openings 58, and is connected to the runner block 14 by means of an annular connecting ring 60 which also fits within the recess 52 and has openings 62 therethrough in alignment with the openings 44 and 58. Bolt means 64 passing through the openings 44, 58 and 62 connect the diaphragm 40 to the runner block 14, as illustrated. Thus, a flexible connection is provided between the spindle 12 and the runner block 14 and, as illustrated, there is a clearance between the connecting ring 46 and the bottom of the recess 54 to allow relative misalignment of the spindle 12 and the runner block 14 through the flexible diaphragm 40.

To feed grinding media centrally of the runner block 14, there is provided a trough member, generally identified as 66, which includes a connecting flange 68 bolted, as at 70, to the runner block 14, and walls defining an annular trough 72. Feed pipes 74 are fixed within apertures 76 in the bottom of the trough 72 and pass angularly through openings 78 and 80 in the driving hub 26 and the runner block 14, respectively, as illustrated. While two feed pipes 74 are shown, it is to be understood that a greater number of feed pipes may be provided, if necessary or desirable.

The inner wall defining the trough 72 is provided with an inwardly projecting annular protuberance 82 which contacts the outer periphery of the driving hub 26 adjacent its upper terminal end, and the trough structure terminates in a horizontal wall 84 having a central opening through which the spindle 12 passes. The wall 84 is, as illustrated, spaced from the adjacent upper terminal end of the driving hub 26 to allow the relative misalignment between the spindle 12 and the runner block 14 as provided by the flexible diaphragm 40. When the spindle 12 and the runner block 14 are relatively misaligned, the line of contact between the protuberance 82 and the hub 26 will necessarily be different from that shown; however, the structure allows the relative misalignment of the spindle 12 and the runner block 14 and also the trough member 66 which is rigidly connected to the runner block 14.

A bracket means 86 surrounds the spindle 12 and has pipes 88 attached thereto, as by bolt means 90, which pipes 88 terminate within the trough 72 and communicate at their other extremities with a source of supply for the grinding media (not shown) by means such as flexible hoses. The bracket 86 is fixed in a manner not shown so as to be stationary, and the bracket 86 and pipes 88 do not interfere with the rotation of the spindle 12, and the trough means 66.

Thus, there has been described a structure which allows a runner block to conform to the surface of the glass being ground having associated means for centrally feeding the grinding media to the runner.

While this invention has been described with reference to one embodiment, it is to be understood that this is by way of illustration and not by way of limitation.

I claim:

1. In a glass surfacing apparatus which includes a vertical spindle and a runner block having attached surfacing means, the improvement comprising a substantially circular recess centrally located in said runner block, a drive hub connected to such spindle and extending within said recess, a flexible annular diaphragm received within said recess and connected to said drive hub and to said runner block thereby providing a flexible coupling between said spindle and said runner block to allow relative angular misalignment therebetween, and means for feeding surfacing media centrally of said runner block including trough means rigidly connected to said runner block and having a protuberance in continuous contact with said drive hub regardless of the relative positions of said spindle and said runner block, said protuberance being so shaped to allow said misalignment between said spindle and said runner block, and feed pipes connected to said trough means and passing through said drive hub and said runner block.

2. Apparatus as recited in claim 1 further including means for feeding surfacing media to said trough means, said feeding means including a plurality of pipes fixedly disposed so as to be stationary and non-rotative with respect to said spindle, trough means, runner block and drive hub.

3. Glass surfacing apparatus as recited in claim 1 wherein said flexible diaphragm is rubber and canvas belting.

4. Glass surfacing apparatus as recited in claim 1 wherein said flexible diaphragm is spring steel.

References Cited in the file of this patent

UNITED STATES PATENTS

| | | |
|---|---|---|
| 1,698,365 | Hitchcock | Jan. 8, 1929 |
| 1,984,205 | Vinella | Dec. 11, 1934 |